United States Patent
Miyajima

(10) Patent No.: US 9,715,162 B2
(45) Date of Patent: Jul. 25, 2017

(54) VIBRATION MOTOR CONTROLLER, AND LENS APPARATUS AND IMAGE PICKUP APPARATUS THAT INCLUDE THE SAME

(71) Applicant: CANON KABUSHIKI KAISHA, Tokyo (JP)

(72) Inventor: Shunsuke Miyajima, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/234,228

(22) Filed: Aug. 11, 2016

(65) Prior Publication Data

US 2017/0052429 A1 Feb. 23, 2017

(30) Foreign Application Priority Data

Aug. 19, 2015 (JP) .................................. 2015-161869
Jul. 29, 2016 (JP) .................................. 2016-149906

(51) Int. Cl.
*G03B 3/10* (2006.01)
*G03B 13/34* (2006.01)
(Continued)

(52) U.S. Cl.
CPC .............. *G03B 13/34* (2013.01); *G02B 7/04* (2013.01); *H02N 2/008* (2013.01); *H02P 25/032* (2016.02); *H04N 5/2251* (2013.01); *G02B 7/08* (2013.01)

(58) Field of Classification Search
USPC ........................................................ 396/135
See application file for complete search history.

(56) References Cited

U.S. PATENT DOCUMENTS 4,954,741 A * 9/1990 Furutsu .................... H02N 2/14
                                                      310/316.02
5,644,199 A * 7/1997 Nojima .................. H02N 2/166
                                                      310/311

(Continued)

FOREIGN PATENT DOCUMENTS

JP   2008067441 A   3/2008
JP   2010166736 A   7/2010
JP   2011067035 A   3/2011

OTHER PUBLICATIONS

Extended European Search Report issued in European Patent Application No. 16001794.3 mailed Mar. 30, 2017.

*Primary Examiner* — Rodney Fuller
(74) *Attorney, Agent, or Firm* — Rossi, Kimms & McDowell LLP

(57) ABSTRACT

A vibration motor controller controls driving velocity of a vibration motor relatively moving a vibrator and a contactor contacting the vibrator, the vibrator oscillated by an electromechanical energy transducer to which first and second frequency signals having a phase difference are applied, and includes a phase difference determiner storing a relationship between the frequency and phase difference between the first and second frequency signals, and determines the phase difference with respect to the frequency based on the relationship, and a controller controlling velocity of the vibration motor based on the frequency of the first and second frequency signals and the phase difference determined by the phase difference determiner based on the frequency. The relationship between the frequency and phase difference in the phase difference determiner does not include a relationship between frequency lower than a resonance frequency in frequency-velocity characteristics of the vibration motor, and the phase difference.

12 Claims, 6 Drawing Sheets

(51) Int. Cl.
  *H04N 5/225*    (2006.01)
  *H02P 25/032*   (2016.01)
  *G02B 7/04*     (2006.01)
  *H02N 2/00*     (2006.01)
  *G02B 7/08*     (2006.01)

(56) References Cited

U.S. PATENT DOCUMENTS

| | | | |
|---|---|---|---|
| 5,889,350 A | | 3/1999 | Yamamoto |
| 5,932,952 A * | | 8/1999 | Takagi ............... H02N 2/004 310/316.02 |
| 5,955,819 A * | | 9/1999 | Takano ............... H02N 2/004 310/316.01 |
| 7,876,063 B2 * | | 1/2011 | Fukushige ........... H02P 9/007 310/254.1 |
| 8,558,488 B2 | | 10/2013 | Murakami |
| 2011/0018475 A1 * | | 1/2011 | Yoshimura ........... H02N 2/004 318/116 |
| 2016/0241167 A1 * | | 8/2016 | Miyajima ............. H02N 2/142 |

* cited by examiner

VIBRATION MOTOR CONTROLLER, AND LENS APPARATUS AND IMAGE PICKUP APPARATUS THAT INCLUDE THE SAME

BACKGROUND OF THE INVENTION

Field of the Invention

The present invention relates to a vibration motor controller, and a lens apparatus and an image pickup apparatus that include the vibration motor controller.

Description of the Related Art

There have been proposed various methods for controlling a vibration motor having a vibrator formed of a metal elastic body or the like to which an electromechanical energy transducer (piezoelectric element or electrostrictive element) is bonded, and a contactor that comes in pressure-contact with the vibrator. Japanese Application Laid-Open No. 2011-067035 discloses a technique of extending a dynamic range of the velocity of the vibration motor by performing phase difference control to change the phase difference with the frequency fixed, and then performing frequency control to change the frequency with the phase difference fixed when the phase difference reaches a prescribed value.

The technique disclosed in Japanese Application Laid-Open No. 2011-067035 is a technique that enables use of a wide dynamic range of the driving velocity of the vibration motor. However, in the frequency control after switching from the phase difference control, even if the frequency is raised or lowered by a certain amount, the driving velocity of the vibration motor does not increase or decrease correspondingly linearly, which lowers the controllability. Hence, in order to reduce an adverse effect of such nonlinearity of the driving velocity with respect to the frequency in the frequency control domain, the frequency at phase difference control may be set to a lower frequency. In this case, however, the controllability at a low velocity region tends to be lowered. This is because a velocity change with a frequency change is large in a frequency region lower than the resonance frequency in the frequency-velocity curve, and because the resonance frequency in the frequency-velocity curve with a small phase difference is higher than that in the frequency-velocity curve with a large phase difference. In sum, if the frequency at the phase difference control is set to a higher frequency, the controllability is lowered due to the adverse effect of the nonlinearity in the frequency control domain; if the frequency at the phase difference control is set to a lower frequency to reduce the adverse effect of the nonlinearity in the frequency control domain, the vibration motor unstably operates due to control in accordance with the frequency-velocity curve in a frequency region lower than the resonance frequency. Hence, it has been difficult to achieve the controllability of the vibration motor and the stability of the vibration motor with a small phase difference at the same time.

SUMMARY OF THE INVENTION

An object of the present invention is to provide a vibration motor controller that can achieve both of controllability and stability with a small phase difference while maintaining a wide dynamic range of the driving velocity.

The vibration motor controller of the present invention controls driving velocity of a vibration motor that relatively moves a vibrator and a contactor in contact with the vibrator, the vibrator oscillated by an electromechanical energy transducer to which a first frequency signal and a second frequency signal having a phase difference are applied. The vibration motor controller includes a phase difference determiner that stores a relationship between frequency and phase difference between the first and second frequency signals, and determines the phase difference with respect to the frequency based on the relationship, and a controller that controls velocity of the vibration motor based on the frequency of the first and second frequency signals and the phase difference determined by the phase difference determiner based on the frequency. The relationship between the frequency and the phase difference stored in the phase difference determiner does not include a relationship between a frequency lower than a resonance frequency in frequency-velocity characteristics of the vibration motor, and the phase difference.

According to the present invention, both of controllability and stability with a small phase difference can be achieved while maintaining a wide dynamic range of the driving velocity.

Further features of the present invention will become apparent from the following description of exemplary embodiments with reference to the attached drawings.

DESCRIPTION OF THE EMBODIMENTS

Preferred embodiments of the present invention will now be described in detail based on the accompanying drawings.

(Outline of Conventional Control for Vibration Motor)

A vibration motor includes a vibrator formed of a metal elastic body or the like to which an electromechanical energy transducer (piezoelectric element or electrostrictive element) is bonded, and a contactor in pressure contact with the vibrator. When plural frequency signals having a phase difference are applied to the piezoelectric element, the vibrator is induced to oscillate, and the vibrator and the contactor move relative to each other to generate a driving force. Driving of the vibration motor is controlled by a method of changing the frequency of the frequency signals applied to the piezoelectric element (also referred to simply as the frequency) (referred to as frequency control) or a method of changing the phase difference between the plural frequency signals applied to the piezoelectric element (also referred to simply as phase difference) (referred to as phase difference control). Frequency control and phase difference control are publicly known and thus, detailed description thereof is omitted.

Figure 6:
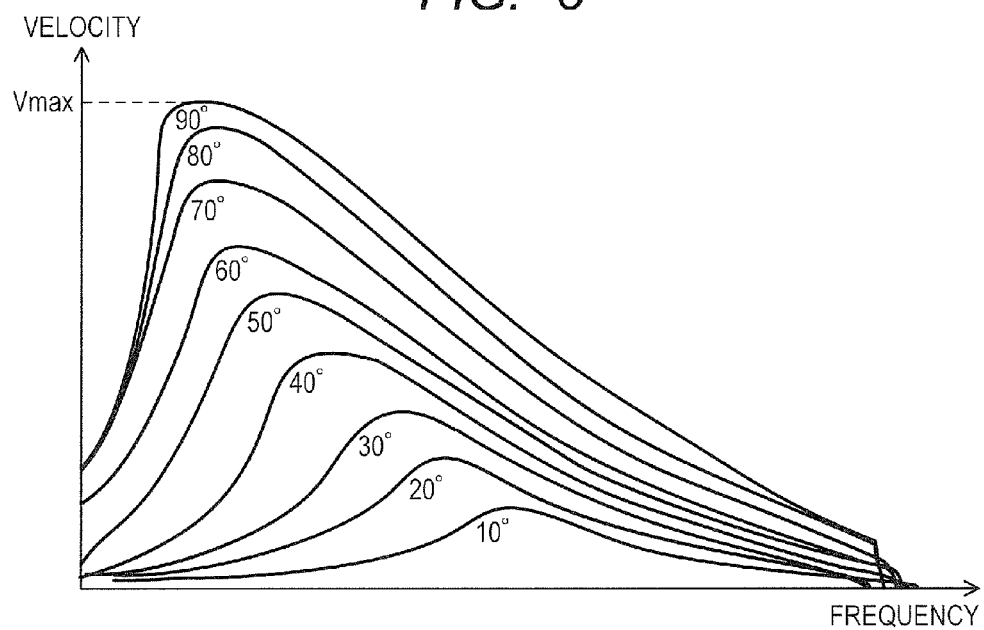
FIG. 6 illustrates velocity characteristics of the vibration motor.

To ensure controllability and extend the dynamic range, the known technique is to perform the phase difference control to change a phase difference with the frequency fixed, and then to perform frequency control to change the frequency with phase difference fixed after the phase difference reaches a prescribed value. FIG. 6 illustrates relationships between frequency and phase difference, and driving velocity of the vibration motor (referred to as frequency-velocity characteristic curve). Using a horizontal axis as frequency and a vertical axis as driving velocity, FIG. 6 illustrates frequency-velocity characteristic curves of the vibration motor in the case where the frequency varies with the phase difference fixed to 10 to 90 degrees. The driving velocity sharply changes relative to the frequency on a lower-frequency side from a frequency at which the highest velocity is reached (hereinafter also referred to as resonance frequency) with each phase difference. Therefore, to improve the controllability, it is generally desirable to control the vibration motor without using this frequency range.

Figure 7:
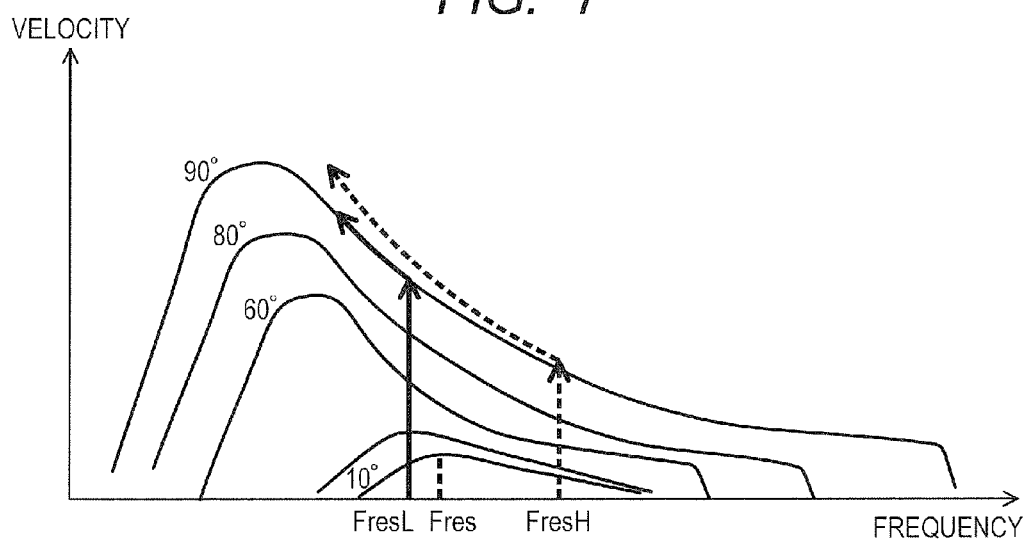
FIG. 7 illustrates a velocity locus at each activation frequency.

FIG. 7 illustrates loci of the driving velocity using both of phase difference control and frequency control in velocity characteristics of the vibration motor in the case where a frequency as a starting point (hereinafter also referred to as an activation frequency) is changed. FIG. 7 is drawn in the same manner as FIG. 6. First, let us consider a case where the frequency at phase difference control is set to a frequency FresH that is higher than a resonance frequency Fres with the phase difference of 10 degrees, and phase difference control is switched to frequency control with the phase difference of 90 degrees. In this case, the driving velocity follows a frequency-velocity locus as represented by a broken arrow. The broken arrow is located higher than the resonance frequency Fres also with the phase difference of 10 degrees, leading to stable control.

However, at frequency control at or over the phase difference of 90 degrees, the broken arrow follows a nonlinear locus. That is, in the frequency control domain, even when the frequency rises or lowers by a certain amount, the driving velocity of the vibration motor does not increase or decrease by a corresponding certain amount, which lowers the controllability. If the frequency at phase difference control is set to a frequency FresL that is lower than the frequency FresH for the purpose of reducing the adverse effect of nonlinearity on the controllability in the frequency control domain, the driving velocity follows a locus as represented by a solid arrow. The solid arrow has a narrower frequency control domain than the broken arrow, enabling reduction of the adverse effect of nonlinearity at frequency control.

However, the frequency FresL at phase difference control is lower than the resonance frequency Fres with the phase difference of 10 degrees. For this reason, if the frequency is set to FresL at phase difference control, the operation of the vibration motor with a small phase difference may become unstable. Generally, the resonance frequency in frequency-velocity characteristics of the vibration motor is higher with the phase difference at which the low velocity is attained (phase difference of 10 degrees in FIG. 7) than with the phase difference at which the high velocity is attained (phase difference of 90 degrees in FIG. 7). For this reason, when the activation frequency is set in a low frequency region, there may be no choice but to perform control by using a frequency region lower than the resonance frequency in the frequency-velocity characteristic curve.

Embodiment 1

Figure 1:
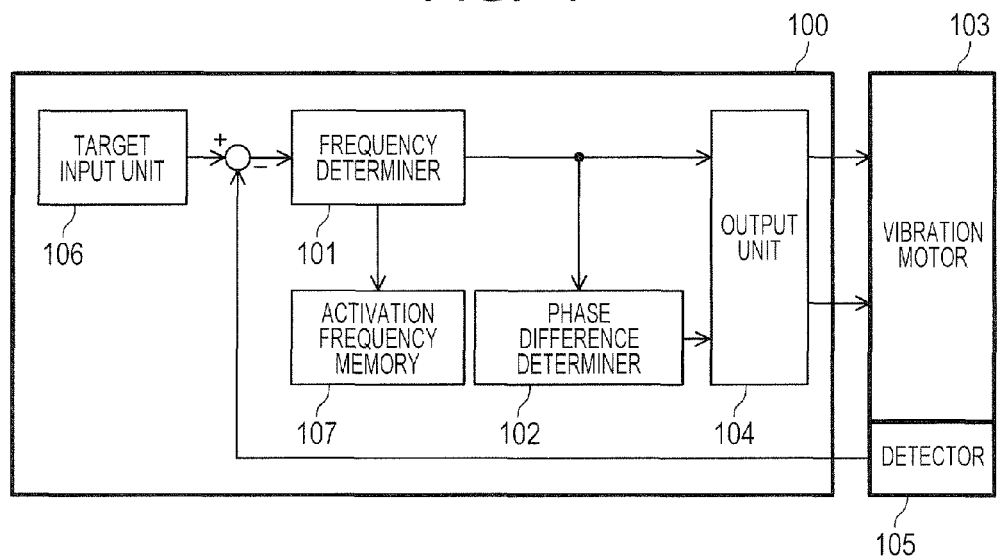
FIG. 1 is a configuration view of a vibration motor controller in accordance with an embodiment of the present invention.

FIG. 1 illustrates configuration of a vibration motor controller in accordance with this embodiment. In following description, for clarification, only main components of the present invention are described, and description of components that do not form features present invention is omitted.

A vibration motor controller 100 controls driving of a vibration motor 103.

A frequency determiner 101 determines frequency of a plurality of frequency signals inputted to the vibration motor 103. For example, the frequency is determined based on a difference between an output of a position detector 105 that detects the position of the vibration motor 103 and an output of a target input unit 106. Further, the lower-frequency side is determined from the activation frequency stored in an activation frequency memory 107. A phase difference determiner 102 determines the phase difference between plural frequency signals according to the frequency determined by the frequency determiner 101. A determination method will be described later in detail. An output unit 104 (controller) outputs the plurality of frequency signals to the vibration motor 103 based on the frequency determined by the frequency determiner 101 and the phase difference determined by the phase difference determiner 102.

Figure 2:
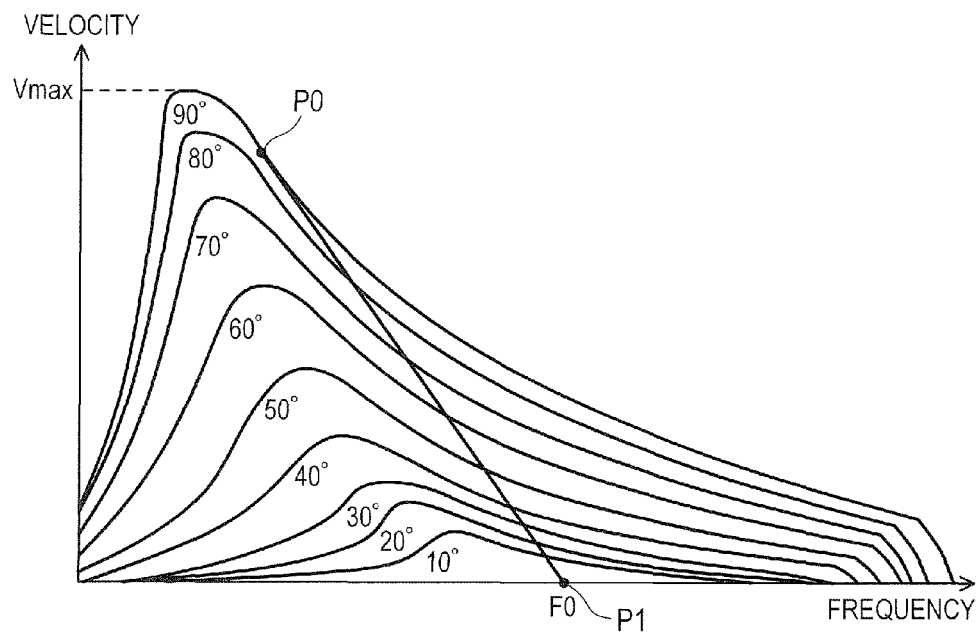
FIG. 2 illustrates frequency-velocity characteristic curves and a frequency-velocity control line of the vibration motor controller in Embodiment 1 of the present invention.

Next, referring to FIGS. 2 to 5B, a method of determining the phase difference using the phase difference determiner 102 will be described. Similar to FIG. 7, FIG. 2 illustrates relationships between frequency and driving velocity of two frequency signals applied to the vibration motor, by using the phase difference as a parameter.

As described above, in terms of frequency-velocity characteristics of the vibration motor, the gradient of the driving velocity relative to the frequency is large in a frequency region lower than the resonance frequency, and thus this region is not used for driving control in consideration of the controllability. When the phase difference becomes large to a certain extent, the driving velocity rapidly decreases at an end on the high-frequency side as illustrated in FIG. 2 (hereinafter also referred to as "steep drop characteristic" or "cliff drop phenomenon") and therefore, this region is also not used for driving control in consideration of controllability. In this manner, the region in the frequency-velocity characteristic curve, in which the driving velocity does not largely change with the change of the frequency is used for controlling, achieving good controllability.

Figure 3A:
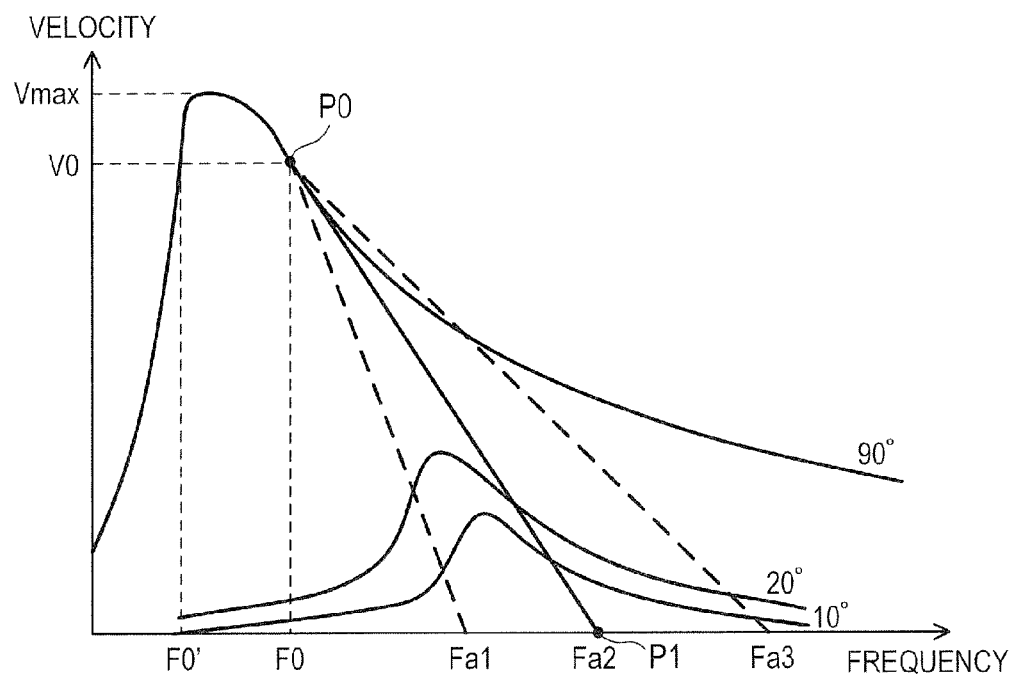
FIG. 3A illustrates frequency-velocity characteristic curves and a frequency-velocity control line of the vibration motor controller in Embodiment 1 of the present invention.

First, a range of the phase difference used for control is determined. Here, as an example, the range of the phase difference for control is set to 0 to 90 degrees. On the frequency-velocity characteristic curve with a predetermined phase difference (here, 90 degrees), a point P0 indicating a frequency F0 that is higher than the resonance frequency, out of frequencies (F0', F0) indicating a highest velocity V0 in a target control velocity range is identified (FIG. 3A). An activation frequency Fa2 that is higher than the resonance frequencies in all the frequency-velocity characteristic curves with respective phase differences and is lower than the high-frequency side exhibiting the steep drop characteristic is set, and a point P1 of the activation frequency Fa2 at the driving velocity of 0 is connected to the point P0 on the frequency-velocity characteristic curve with the predetermined phase difference (90 degrees).

The activation frequency Fa2 is set such that a straight line P0-P1 does not cross any of the frequency-velocity characteristic curves with the respective phase differences in the frequency region lower than their resonance frequencies (ex. the line P0-P1 crosses if a frequency Fa1 is selected), and does not cross the frequency-velocity characteristic curve with the phase difference (here, 90 degrees) at which a highest velocity Vmax is attained (ex. the line P0-P1 crosses if a frequency Fa3 is selected).

Since the straight line P1-P0 thus determined represents the linear relationship between frequency and driving velocity, the driving velocity is controlled based on this relationship by changing the frequency, and therefore high controllability of the driving velocity relative to the frequency can be achieved. Here, to change the driving velocity on the straight line P1-P0 that is a control line, with change of the frequency, the phase difference needs to be changed with the change of the frequency so as to satisfy the relationship between frequency and phase difference on the straight line as illustrated in FIGS. 2, 3A and 3B.

For this reason, the relationship between frequency and phase difference in the range of the frequency Fa2 to the frequency F0 (driving velocity 0 to V0), which satisfies the straight line P1-P0 as the control line (FIG. 3B), is held in the phase difference determiner 102. The relationship between frequency and phase difference in FIG. 3B, in the form of a table, a formula, or the like, is held in the phase difference determiner 102, and the phase difference determiner 102 determines the phase difference outputted to the vibration motor according to the frequency, thereby linearly controlling the driving velocity in response to an input of frequency.

The straight line P1-P0 that is the frequency-velocity control line illustrated in FIG. 3A should be set so as not to cross any of the frequency-velocity characteristic curves with respective phase differences in the frequency region lower than the resonance frequency, and not to cross the frequency-velocity characteristic curve with the phase difference at which the highest velocity is attained. Since the relationship between driving velocity and frequency is linear, the frequency corresponding to the highest velocity is the lowest frequency in the control frequency range.

Figure 3B:
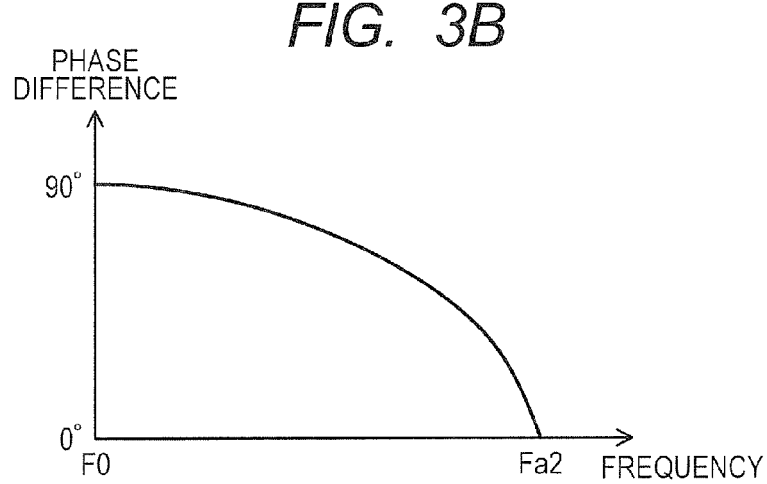
FIG. 3B illustrates relationships between frequency and phase difference of the vibration motor controller in Embodiment 1 of the present invention.
Figure 4A:
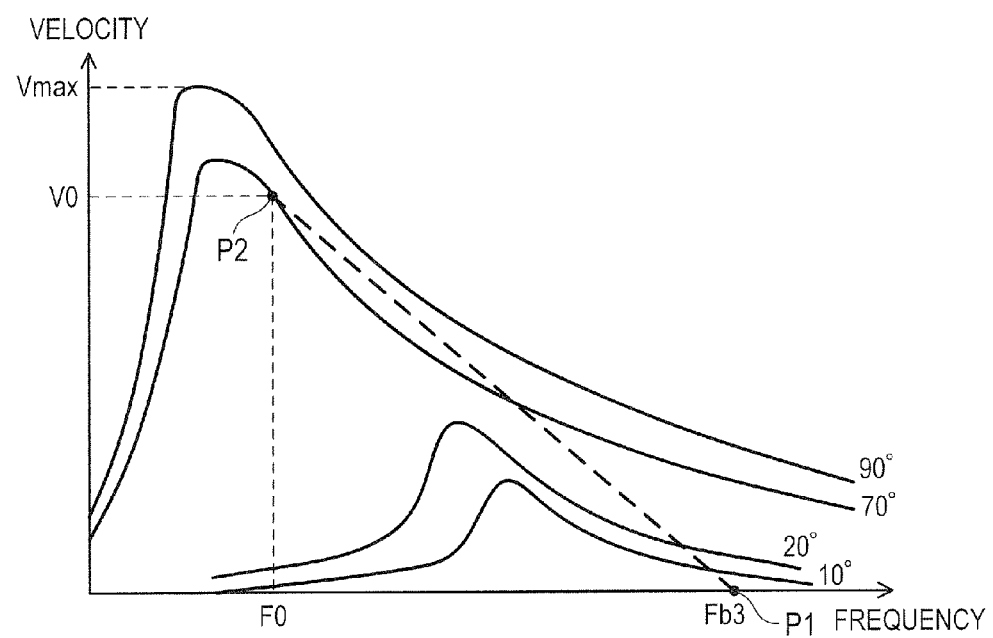
FIG. 4A illustrates frequency-velocity characteristic curves and a frequency-velocity control line of the vibration motor controller in Embodiment 1 of the present invention.
Figure 4B:
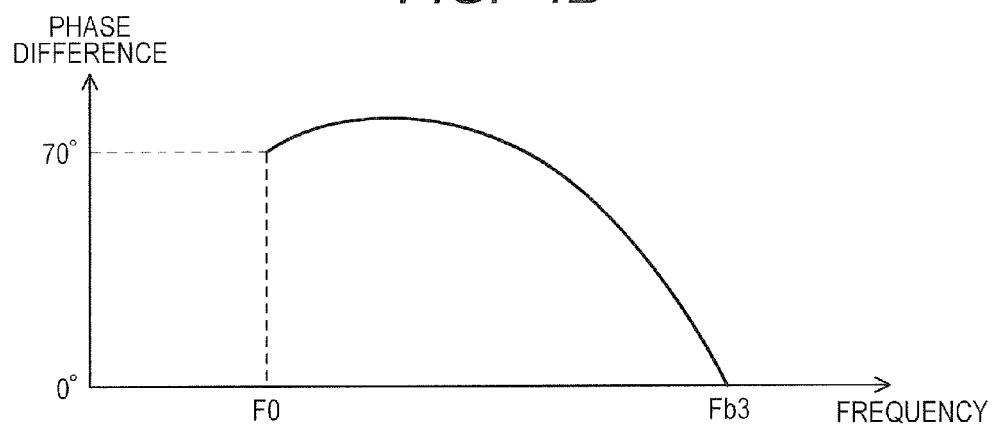
FIG. 4B illustrates relationships between frequency and phase difference of the vibration motor controller in Embodiment 1 of the present invention.

However, the phase difference corresponding to the highest velocity is not limited to the largest phase difference, as illustrated in FIG. 3B. For example, when, as illustrated in FIG. 4A, the phase difference (70 degrees in FIG. 4A) of the frequency-velocity characteristic curve at which the highest velocity is attained is not the phase difference (90 degrees in FIG. 4A) of on the frequency-velocity characteristic curve at which the highest velocity is attained in the phase difference range used as the control range, the phase difference is not necessarily largest at the highest velocity V0 in the control range, as illustrated in FIG. 4B. In FIG. 4B, as the frequency is lowered from the activation frequency, the phase difference increases once and then decreases, so that the frequency and the phase difference correspond to the highest velocity. Based on such frequency-velocity control line, the frequency and the driving velocity can be linearly controlled with high controllability.

Embodiment 2

A vibration motor 103 in accordance with embodiment 2 of the present invention will be described below with reference to FIGS. 5A and 5B. In this Embodiment, according to frequency-velocity characteristics of the vibration motor 103, the desired highest velocity V0 to the lowest velocity cannot be linearly controlled with respect to frequency.

Configuration of the vibration motor in this embodiment is the same as that in Embodiment 1 and thus, description thereof is omitted.

Again, an example is described in which the range of the phase difference for control is set to 0 to 90 degrees. For a highest velocity V0 to be attained in the control range, frequencies (F0', F0) indicating the highest velocity V0 on the frequency-velocity characteristic curve with a phase difference (here, 90 degrees) attaining the highest velocity are identified first, and then a point P0 indicating the frequency F0 that is higher than the resonance frequency is identified from the frequencies (F0', F0).

Next, an activation frequency that is higher than the resonance frequency and is lower than the high-frequency side exhibiting the steep drop characteristic is set. Here, a straight line P0-P1 that connects the point P1 at the activation frequency and the driving velocity of 0 to the point P0 on the frequency-velocity characteristic curve with the phase difference of 90 degrees can linearly control the range of the driving velocity 0 to the highest velocity V0 with respect to the frequency in a following case. That is, the straight line P0-P1 does not cross any of the frequency-velocity characteristic curves with respective phase differences in the frequency region lower than the resonance frequency (the line P0-P1 crosses in the case of selecting a frequency Fb2), and does not cross the frequency-velocity characteristic curve with the phase difference at which the highest velocity is attained (the line P0-P1 crosses in the case of selecting a frequency Fb3). However, since the vibration motor having frequency-velocity characteristics as illustrated in FIG. 5A have no straight line P0-P1 that satisfies the above condition, a following frequency-velocity control line is adopted.

First, an activation frequency Fb3 that is higher than the resonance frequency in any of frequency-velocity characteristic curves with respective phase differences and is lower than the high-frequency side exhibiting the steep drop characteristic is set, and a point P2 at the highest velocity is found such that a straight line connecting the point P1 to the point P1 at the activation frequency Fb3 does not cross the frequency-velocity characteristic curve with the phase difference of 90 degrees that exhibits the highest velocity, but makes contact with the straight line. In most cases, at the point P2, the straight line P1-P2 is a tangent line of the frequency-velocity characteristic curve with the phase difference of 90 degrees at which the highest velocity is attained.

In the range of the frequency Fb3 at the point P1 to the frequency Fb1 at the point P2, this straight line is used as the frequency-velocity control line to control velocity, and in the range of the frequency Fb1 to the frequency F0 indicating the highest velocity V0, the frequency-velocity characteristic curve with the phase difference of 90 degrees is used as the control line to change frequency with the phase difference kept constant (here, 90 degrees).

In the frequency-velocity control lines thus determined (straight line P1-P2, curve P2-P0), a relationship between frequency and driving velocity in the range of the frequency Fb3 to the frequency Fb1 is linear. The relationship between frequency and driving velocity is not linear in the range of the frequency Fb1 to the frequency F0 (driving velocity V1

(first velocity) to V0) and however, can achieve controllability that can be acquired in the section of the straight line P1-P2.

Since the straight line P1-P2 is tangent to the curve P2-P0, the straight line P1-P2 can be transitioned to the curve P2-P0 without causing sharp acceleration or deceleration, which enables smooth transition between the control domains. It should be noted that the phase difference needs to be changed with change of frequency so as to satisfy the relationship between frequency and phase difference on the control line P1-P0 as illustrated in FIG. 5A. For this reason, the relationship between frequency and phase difference in the range of the frequency Fb3 to the frequency F0 (driving velocity 0 to V0), which satisfies the straight line P1-P0 as the control line (FIG. 5B), is held in the form of a table, formula, or the like in the phase difference determiner 102.

Figure 5A:
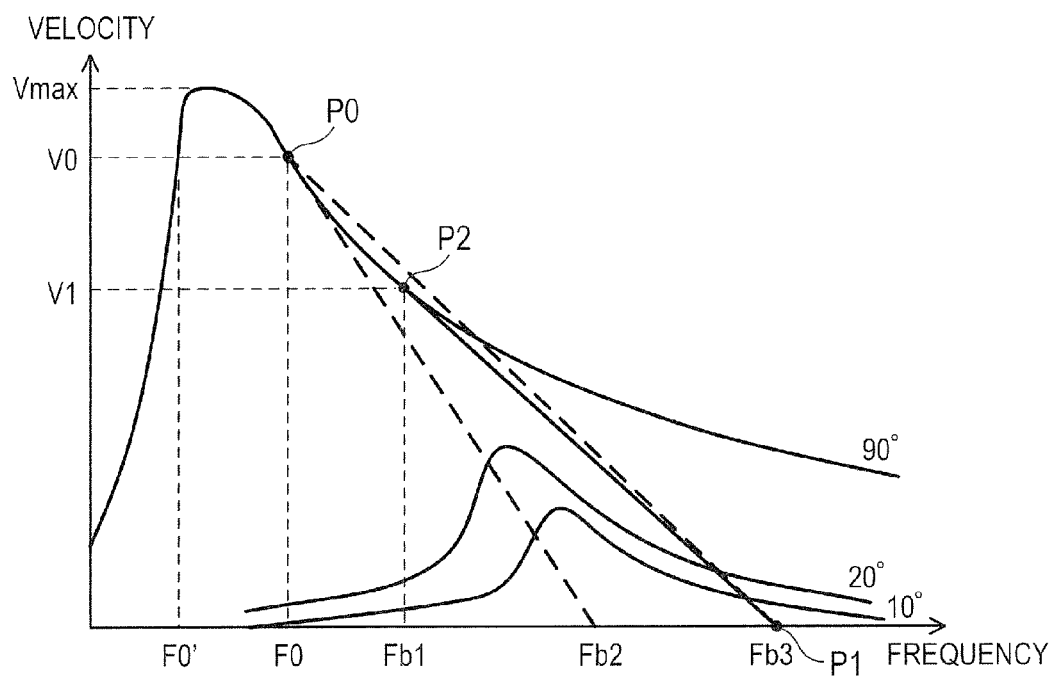
FIG. 5A illustrates frequency-velocity characteristic curves and a frequency-velocity control line of the vibration motor controller in Embodiment 2 of the present invention.
Figure 5B:
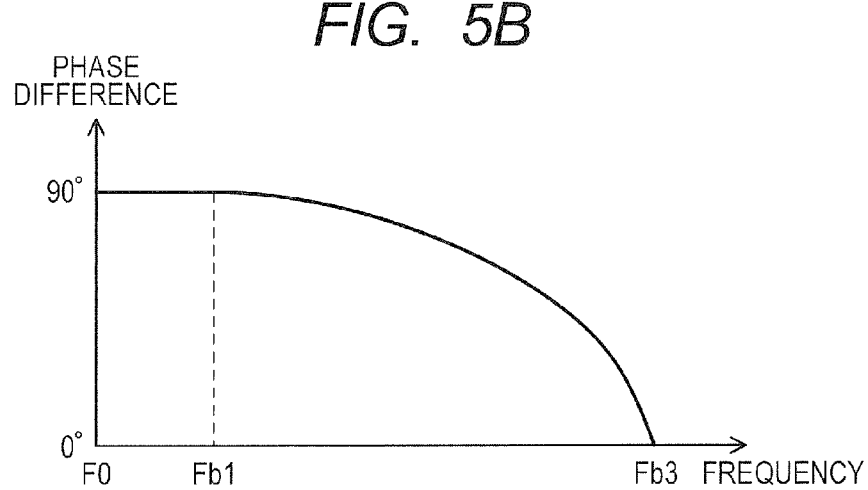
FIG. 5B illustrates relationships between frequency and phase difference of the vibration motor controller in Embodiment 2 of the present invention.

The relationship between frequency and phase difference in FIG. 5B is held in the phase difference determiner 102, and the phase difference determiner 102 determines the phase difference outputted to the vibration motor according to the frequency, thereby controlling the driving velocity on the lower-velocity side linearly and controlling the driving velocity on the higher-velocity side substantially linearly, in response to an input of frequency.

With this configuration, the controller of the present invention can achieve both of controllability and stability with a small phase difference can be achieved while maintaining a wide dynamic range of the driving velocity.

The control line in Embodiment 1 as illustrated in FIG. 4A may be used as the frequency-velocity control line in the straight line P1-P2 in Embodiment 2.

With the above-mentioned configuration, by determining phase difference according to the frequency, while using frequency-velocity characteristics higher than the resonance frequency even with a small phase difference, driving velocity can be controlled according to the frequency linearly or substantially linearly in the whole velocity control domain. Thus, both of controllability and stability with a small phase difference can be achieved. The dynamic range of driving velocity can be made large by changing phase difference while changing the frequency from the activation frequency to the lower-frequency side.

In this embodiment, although the used phase difference is 90 degrees (0 degrees to 90 degrees), the present invention is not limited to this. For example, 80 degrees or 70 degrees can achieve the advantages of the present invention.

In this embodiment, although the phase difference is changed in the range of 0 degrees to 90 degrees, any phase difference that can be changed to exhibit low velocity to high velocity may be used. For example, a range of 90 degrees to 180 degrees or −90 degrees to 0 degrees can achieve the advantages of the present invention.

In this embodiment, although the phase difference at the frequency Fb3 in FIGS. 5A and 5B is set to 0 degree, any phase difference that can acquire the lowest velocity necessary for the controller may be used, and the control velocity for achieving the advantages of the present invention does not necessarily include 0. For example, the phase difference of 10 degrees may be set at the frequency Fb3, and a curve or straight line that is similar to that in FIG. 5A may be acquired based on a straight line connecting the point to the point P2 to achieve the advantages of the present invention.

In this embodiment, although the activation frequency is set to Fb3, any activation frequency that satisfies the above condition may be used. For example, when a frequency between the resonance frequency with the phase difference of 10 degrees and the frequency Fb3 is set as the activation frequency, and a straight line connecting the point to the point P2 as described above is a straight line that passes higher than the resonance frequency with each phase difference on frequency-velocity characteristics of the vibration motor, the advantages of the present invention can be achieved.

The vibration motor controller in Embodiment 1 or 2 may be used as a driving motor controller for a lens apparatus including a movable optical member, and a vibration motor for driving the movable optical member as a driving unit. When the movable optical member is a movable lens group, an operating ring or an operating knob corresponds to the target input unit 106, and the frequency determiner 101 determines a frequency based on a difference between a target value from the target input unit 106 and a detection value from the detector 105 for detecting position of the movable lens group. The determined frequency is inputted to the phase difference determiner 102, the phase difference is determined based on the stored relationship between frequency and phase difference, and the vibration motor 103 is controlled based on the phase difference. This can realize the lens apparatus capable of producing the advantages present invention, that is, achieving both of controllability and stability with a small phase difference can be achieved while maintaining a wide dynamic range of the driving velocity.

The vibration motor controller in Embodiment 1 or 2 may be used as a driving motor controller for an image pickup apparatus including a lens apparatus that has a movable optical member and a vibration motor for driving the movable optical member as a driving unit, and an image pickup element for picking up an optical image formed by the lens apparatus. Also in this case, as in the case of applying the controller of the present invention to the lens apparatus, it is possible to provide the image pickup apparatus capable of producing the advantages present invention, that is, achieving both of controllability and stability with a small phase difference can be achieved while maintaining a wide dynamic range of the driving velocity.

(Definition of Linearity)

Figure 8:
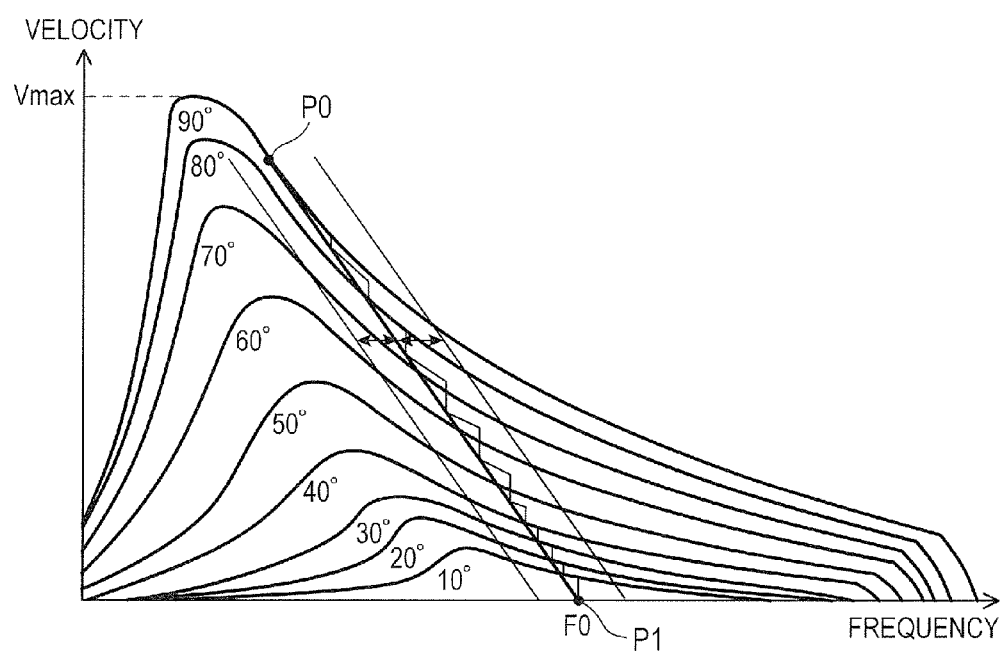
FIG. 8 illustrates definition of linearity in each embodiment of the present invention.

Referring to FIG. 8, linear control of driving velocity in each embodiment will be described in more detail. Linear control of driving velocity in each embodiment of the present invention is not necessarily linear in a strict mathematical sense, and phase difference control and frequency control may be repeated in a range delimited by a double-headed arrow and oblique lines in FIG. 8.

The range illustrated in FIG. 8 is the range having a predetermined width on each of a lower frequency side and a higher frequency side of a straight line connecting P0 to P1. For example, this range is the range having a width of ±10% or less, more preferably, ±6% or less of the width of the use frequency range with respect to the straight line connecting P0 to P1. Describing more detail, when the activation frequency is 94 kHz and the frequency at which the highest velocity is attained is 90 kHz, the range illustrated in FIG. 8 is the range of ±0.4 kHz from the straight line connecting P0 to P1. Further, the range illustrated in FIG. 8 may be a range having a predetermined width on each of a higher velocity side and a lower velocity side of the straight line straight line connecting P0 to P1. For example, this range is a range of ±10% or less, more preferably, ±6% or less of the highest velocity with respect to the straight line connecting P0 to P1.

Linear control of the driving velocity in each embodiment of the present invention refers to characteristic that, in a qualitative manner, when the vibration motor is used for driving of the focus lens and the frequency determiner changes the frequency with a minimum resolution that can be determined by the frequency determiner, focal depth changing due to the change of velocity does not depart from a predetermined focal depth when the focus lens ideally drives.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-161869, filed Aug. 19, 2015, and Japanese Patent Application No. 2016-149906, filed Jul. 29, 2016, which are hereby incorporated by reference herein in their entirety.

What is claimed is:

1. A vibration motor controller for controlling driving velocity of a vibration motor that relatively moves a vibrator and a contactor in contact with the vibrator, the vibrator oscillated by an electromechanical energy transducer to which a first frequency signal and a second frequency signal having a phase difference are applied,
the vibration motor controller comprising:
a phase difference determiner that stores a relationship between a frequency and the phase difference between the first and second frequency signals, and determines the phase difference with respect to the frequency based on the relationship; and
a controller that controls velocity of the vibration motor based on the frequency of the first and second frequency signals and the phase difference determined by the phase difference determiner based on the frequency, wherein the relationship between the frequency and the phase difference stored in the phase difference determiner does not include a relationship between a frequency lower than a resonance frequency in frequency-velocity characteristics of the vibration motor, and the phase difference.

2. The vibration motor controller according to claim 1, wherein the velocity of the vibration motor based on the relationship between the frequency and the phase difference stored in the phase difference determiner has a range in which the velocity is linear relative to the frequency in a control range.

3. The vibration motor controller according to claim 2, wherein the range in which the velocity of the vibration motor based on the relationship between the frequency and the phase difference stored in the phase difference determiner is linear relative to the frequency includes the lowest velocity in the control range.

4. The vibration motor controller according to claim 2, wherein the range in which the velocity of the vibration motor based on the relationship between the frequency and the phase difference stored in the phase difference determiner is linear relative to the frequency does not include a range from the highest velocity in the control range to a first velocity lower than the highest velocity.

5. The vibration motor controller according to claim 4, wherein the phase difference determiner stores a relationship in which the frequency changes with respect to a constant phase difference, as a relationship between the frequency and the phase difference in the range from the highest velocity in the control range to the first velocity.

6. The vibration motor controller according to claim 2, wherein the range in which the velocity of the vibration motor based on the relationship between a frequency and the phase difference stored in the phase difference determiner is linear relative to the frequency includes the highest velocity in the control range.

7. The vibration motor controller according to claim 2, wherein the resonance frequency in frequency-velocity characteristics of the vibration motor is a frequency at which the highest velocity is reached under a condition where the phase difference is kept constant.

8. A lens apparatus comprising:
a movable optical member;
a vibration motor that drives the movable optical member; and
a vibration motor controller as a controller for the vibration motor, wherein the vibration motor controller controls driving velocity of a vibration motor that relatively moves a vibrator and a contactor in contact with the vibrator which is oscillated by an electromechanical energy transducer to which a first frequency signal and a second frequency signal having a phase difference are applied,
the vibration motor controller comprising:
a phase difference determiner that stores a relationship between a frequency and the phase difference between the first and second frequency signals, and determines the phase difference with respect to the frequency based on the relationship; and
a controller that controls velocity of the vibration motor based on the frequency of the first and second frequency signals and the phase difference determined by the phase difference determiner based on the frequency, wherein the relationship between the frequency and the phase difference stored in the phase difference determiner does not include a relationship between a frequency lower than a resonance frequency in frequency-velocity characteristics of the vibration motor, and the phase difference.

9. An image pickup apparatus comprising:
a lens apparatus; and
an image pickup element that captures an optical image formed by the lens apparatus,
the lens apparatus comprising:
   a movable optical member;
   a vibration motor that drives the movable optical member; and
   a vibration motor controller as a controller for the vibration motor, wherein the vibration motor controller controls driving velocity of a vibration motor that relatively moves a vibrator and a contactor in contact with the vibrator which is oscillated by an electromechanical energy transducer to which a first frequency signal and a second frequency signal having a phase difference are applied,
   the vibration motor controller comprising:
      a phase difference determiner that stores a relationship between a frequency and the phase difference between the first and second frequency signals, and determines the phase difference with respect to the frequency based on the relationship; and
      a controller that controls velocity of the vibration motor based on the frequency of the first and second frequency signals and the phase difference determined by the phase difference determiner based on the frequency, wherein the relationship between the frequency and the phase difference stored in the phase difference determiner does not include a relationship between a frequency lower than a resonance frequency in frequency-velocity characteristics of the vibration motor, and the phase difference.

10. A vibration motor controller for controlling driving velocity of a vibration motor that relatively moves a vibrator and a contactor in contact with the vibrator, the vibrator oscillated by an electromechanical energy transducer to which a first frequency signal and a second frequency signal having a phase difference are applied,
   the vibration motor controller comprising:
      a phase difference determiner that stores a relationship between a frequency and the phase difference between the first and second frequency signals, and determines the phase difference with respect to the frequency based on the relationship; and
      a controller that controls velocity of the vibration motor based on the frequency of the first and second frequency signals and the phase difference determined by the phase difference determiner based on the frequency,
   wherein the velocity of the vibration motor based on the relationship between the frequency and the phase difference stored in the phase difference determiner has a range in which the velocity is linear relative to the frequency in a control range.

11. A lens apparatus comprising:
a movable optical member;
a vibration motor that drives the movable optical member; and
a vibration motor controller as a controller for the vibration motor, wherein the vibration motor controller controls driving velocity of a vibration motor that relatively moves a vibrator and a contactor in contact with the vibrator which is oscillated by an electromechanical energy transducer to which a first frequency signal and a second frequency signal having a phase difference are applied,
   the vibration motor controller comprising:
      a phase difference determiner that stores a relationship between a frequency and the phase difference between the first and second frequency signals, and determines the phase difference with respect to the frequency based on the relationship; and
      a controller that controls velocity of the vibration motor based on the frequency of the first and second frequency signals and the phase difference determined by the phase difference determiner based on the frequency,
   wherein the velocity of the vibration motor based on the relationship between the frequency and the phase difference stored in the phase difference determiner has a range in which the velocity is linear relative to the frequency in a control range.

12. An image pickup apparatus comprising:
a lens apparatus; and
an image pickup element that captures an optical image formed by the lens apparatus,
the lens apparatus comprising:
   a movable optical member;
   a vibration motor that drives the movable optical member; and
   a vibration motor controller as a controller for the vibration motor, wherein the vibration motor controller controls driving velocity of a vibration motor that relatively moves a vibrator and a contactor in contact with the vibrator which is oscillated by an electromechanical energy transducer to which a first frequency signal and a second frequency signal having a phase difference are applied,
   the vibration motor controller comprising:
      a phase difference determiner that stores a relationship between a frequency and the phase difference between the first and second frequency signals, and determines the phase difference with respect to the frequency based on the relationship; and
      a controller that controls velocity of the vibration motor based on the frequency of the first and second frequency signals and the phase difference determined by the phase difference determiner based on the frequency,
   wherein the velocity of the vibration motor based on the relationship between the frequency and the phase difference stored in the phase difference determiner has a range in which the velocity is linear relative to the frequency in a control range.

* * * * *